(12) United States Patent
Hiromitsu et al.

(10) Patent No.: US 7,477,795 B2
(45) Date of Patent: Jan. 13, 2009

(54) IMAGE COMPRESSION AND EXPANSION TECHNIQUE

(75) Inventors: Toshiroh Hiromitsu, Fujisawa (JP); Yasuhiro Kitabatake, Fujisawa (JP); Seiji Motai, Sagamihara (JP); Yasushi Tsukamoto, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 11/157,242

(22) Filed: Jun. 21, 2005

(65) Prior Publication Data

US 2005/0286789 A1 Dec. 29, 2005

(30) Foreign Application Priority Data

Jun. 24, 2004 (JP) ............................. 2004-186266

(51) Int. Cl.
*G06K 9/36* (2006.01)
(52) U.S. Cl. ..................................... 382/243
(58) Field of Classification Search ................. 382/173, 382/176–181, 187, 190, 200; 345/467–470; 348/465, 467–468, 586, 588, 589, 600
See application file for complete search history.

(56) References Cited

U.S. PATENT DOCUMENTS

| | | | | |
|---|---|---|---|---|
| 5,684,542 A * | 11/1997 | Tsukagoshi | .................. | 348/468 |
| 5,748,789 A * | 5/1998 | Lee et al. | .................... | 382/243 |
| 5,982,937 A * | 11/1999 | Accad | ........................ | 382/239 |
| 6,144,772 A * | 11/2000 | Garland et al. | .............. | 382/239 |
| 6,366,699 B1 * | 4/2002 | Kuwano et al. | ............. | 382/199 |
| 6,804,397 B2 * | 10/2004 | Kaneko et al. | .............. | 382/190 |
| 7,054,539 B2 * | 5/2006 | Ito et al. | ........................ | 386/46 |
| 7,280,158 B2 * | 10/2007 | Matsubara | .................. | 348/598 |

FOREIGN PATENT DOCUMENTS

| | | |
|---|---|---|
| JP | 05236285 | 10/1993 |
| JP | 7240845 | 9/1995 |
| JP | 9098421 | 4/1997 |
| JP | 11205788 | 7/1999 |
| JP | 2002262102 | 9/2002 |
| JP | 2003087572 | 3/2003 |

* cited by examiner

*Primary Examiner*—Jose L Couso
(74) *Attorney, Agent, or Firm*—Duke W. Yee; Mark E. McBurney; Gerald H. Glanzman (57) ABSTRACT

The present invention aims at improving an image compression rate and enhancing quality of images after expansion. An image compression device generates compressed data formed by compressing an image. The device includes a boundary area detection section for detecting boundary areas which include both of internal and external parts of an object rendered in the image, from among plural areas included in the image; a non-boundary area data generation section for, by compressing non-boundary areas which are not the boundary areas in the image, in a predetermined compression mode, generating partial compressed data in the compressed data, corresponding to the non-boundary areas; and a boundary area data generation section for generating partial compressed data in the compressed data, corresponding to the boundary areas, from the boundary areas, in a mode in which difference between images before compression and after expansion is less in comparison with a case where the boundary areas are compressed in the predetermined compression mode.

3 Claims, 11 Drawing Sheets

IMAGE COMPRESSION AND EXPANSION TECHNIQUE

BACKGROUND OF THE INVENTION

1. Field of the Invention

The present invention relates to an image compression device, an image expansion device, an image processing system, an image compression method, an image expansion method, a program and a recording medium. Particularly, the present invention relates to an image compression device, an image expansion device, an image processing system, an image compression method, an image expansion method, a program and a recording medium, in which a compression mode is changed based on characteristics of an image to be compressed.

2. Description of the Related Art

Recently, a telop image for displaying spoken words of a voice as text has been frequently used in television broadcasting. Since the telop image is animation, its large data size may sometimes cause a problem. Accordingly, a technique for compressing a telop image to reduce its data size has been proposed in Japanese Published Patent Application No. H9-65265 (Patent Document 1). For example, according to this technique, when plural frames to be sequentially and continuously displayed are the same, these plural frames are stored in a storage device as one frame. Thereby, it is possible to compress an image in a time zone to reduce the amount of storage occupied thereby.

As another technique intended to improve image quality and compression rate, there has been proposed an image compression technique which is applicable not only to a telop image but also to a still image in Japanese Published Patent Application No. 2000-184205 (Patent Document 2). According to this technique, each object in an image is compressed in a different compression mode depending on whether the object is a character, filled graphics, stroked graphics, graphics for masking or the like.

As described above, the technique of Patent Document 1 assumes that the plural frames to be sequentially and continuously displayed should be the same. Therefore, when plural frames different from one another are to be displayed, the compression rate decreases. In the technique of Patent Document 2, an object is compressed in a compression mode specified for the object. However, there may be a case that one object includes both of a part requiring relatively high image quality and a part for which lower image quality is acceptable. In this case, there may be caused deterioration of the image quality or decrease of the compression rate.

SUMMARY OF THE INVENTION

In view of the above, the object of the present invention is to provide an image compression device, an image expansion device, an image processing system, an image compression method, an image expansion method, a program and a recording medium which are capable of solving the above problems. This object can be achieved by a combination of features described in the independent claims. The dependent claims describe additional advantageous implementations.

In order to solve the above problems, in a first aspect of the present invention, there is provided an image compression device for generating compressed data formed by compressing an image, comprising a boundary area detection section for detecting boundary areas which include both of internal and external parts of an object rendered in the image, from among plural areas included in the image, a non-boundary area data generation section for, by compressing non-boundary areas which are not the boundary areas in the image in a predetermined compression mode, generating partial compressed data in the compressed data, corresponding to the non-boundary areas, and a boundary area data generation section for generating partial compressed data in the compressed data, corresponding to the boundary areas, from the boundary areas, in a mode in which difference between images before compression and after expansion is less in comparison with a case where the boundary areas are compressed in the predetermined compression mode; an image compression method using the device; a program causing a computer to function as the device; and a recording medium on which the program is recorded.

In a second aspect of the present invention, an image expansion device is provided for expanding compressed data formed by compressing an image. The device comprises a boundary area indication information acquisition section for acquiring, in association with the compressed data, boundary area indication information indicating, for each of plural areas included in the image, whether the area is a boundary area which includes both of internal and external parts of an object rendered in the image or a non-boundary area which includes only one of the internal and external parts of the object rendered in the image, a non-boundary area data restoration section for restoring the non-boundary areas by expanding partial compressed data in the compressed data, corresponding to the non-boundary areas, in an expansion mode corresponding to a predetermined compression mode, and a boundary area data restoration section for restoring the boundary areas from partial compressed data in the compressed data, corresponding to the boundary areas, in a mode in which difference between images before compression and after expansion is less in comparison with a case where the partial compressed data is expanded in the expansion mode; an image compression method using the device; a program causing a computer to function as the device; and a recording medium on which the program is recorded.

The above summary of the invention does not enumerate all necessary features of the present invention, and a combination of the feature groups can also make the invention.

According to the present invention, it is possible to enhance an image compression rate and increase image quality after expansion.

DESCRIPTION OF THE PREFERRED EMBODIMENT

While the present invention will be described below with reference to the embodiments thereof, the embodiments described below do not limit the invention according to the claims, and all the combinations of features described in the embodiments are not necessarily required for solution means of the invention.

Figure 1:
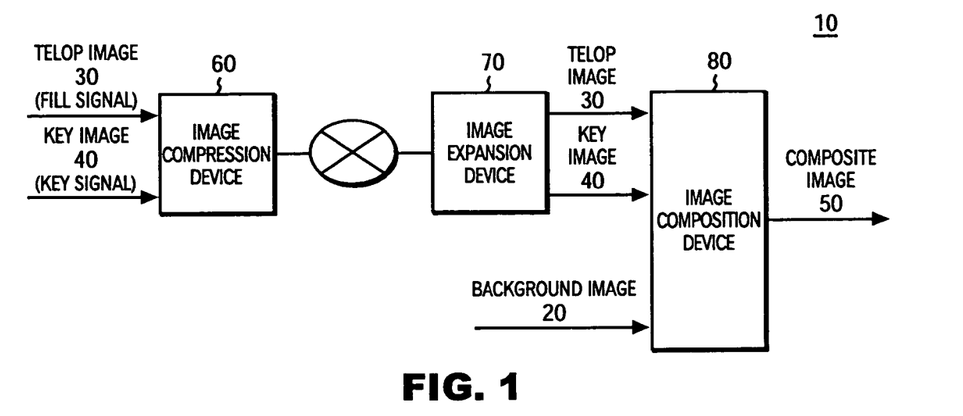
FIG. 1 shows the entire configuration of a telop system 10.

FIG. 1 shows the configuration of a telop system 10. The telop system 10 is an example of an image processing system according to the present invention and comprises an image compression device 60, an image expansion device 70 and an image composition device 80. The image compression device 60 and the image expansion device 70 are connected to each other via a data transmission channel. The image compression device 60 receives a telop image 30 to be displayed in a manner that it is superimposed on a background image 20, from an external device as a fill signal. The image compression device 60 also receives a key image 40 in which transmittances are arranged for the respective pixels of the telop image 30 through which a background image 20 is displayed, from an external device as a key signal.

For example, the image compression device 60 may receive the fill signal and the key signal from a telopper device for generating the telop image 30 and the key image 40 or from an image pick-up device such as a TV camera or a video camera. The image compression device 60 then generates compressed data formed by compressing the received telop image 30 and key image 40. The image compression device 60 transmits the generated compressed data to the image expansion device 70 via a network.

The image expansion device 70 restores the telop image 30 and the key image 40 by expanding the compressed data received. The image expansion device 70 then outputs the restored telop image 30 to the image composition device 80 as a fill signal. The image expansion device 70 outputs the restored key image 40 to the image composition device 80 as a key signal. By superimposing the telop image 30 on the background image 20 based on the key image 40, the image composition device 80 generates and outputs a composite image 50.

As described above, the telop system 10 in this embodiment is a system which properly transmits the telop image 30 via a network or the like even when the transmission source of the telop image 30 and the image composition device 80 are provided remotely from each other. The telop system 10 is intended to efficiently utilize a data transmission channel by enhancing the compression rate for compressing the telop image 30 and the key image 40, and to enhance the quality of the composite image 50 by reducing difference between images before compression and after expansion.

Figure 2:
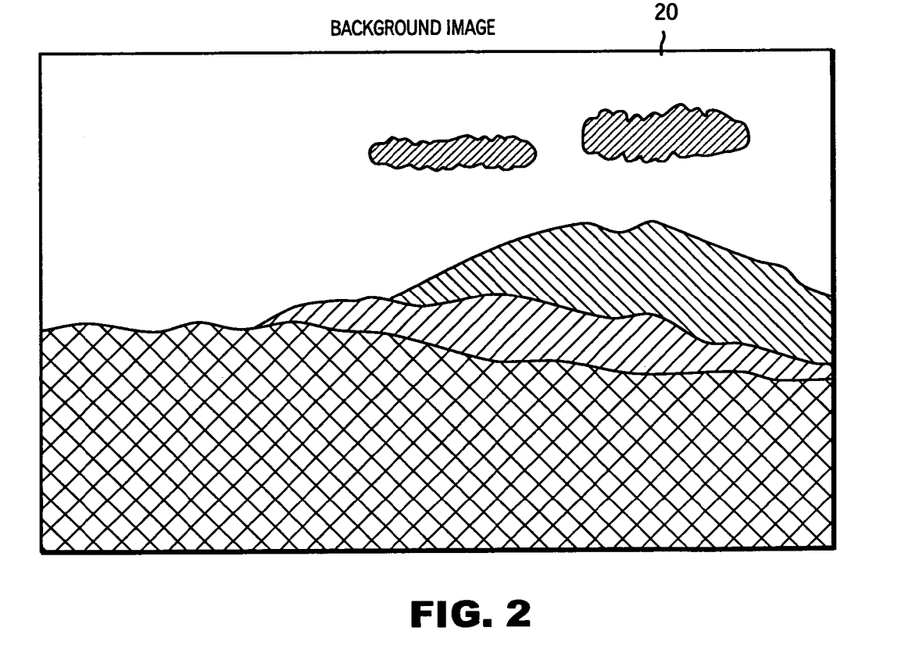
FIG. 2 shows an example of a background image 20.

FIG. 2 shows an example of the background image 20. The background image 20 is data in which pixel values of the respective pixels of an image to be displayed are arranged. For example, in FIG. 2, the background image 20 contains mountains displayed at the lower part of the image, and sky and clouds displayed at the upper part of the image.

Figure 3:
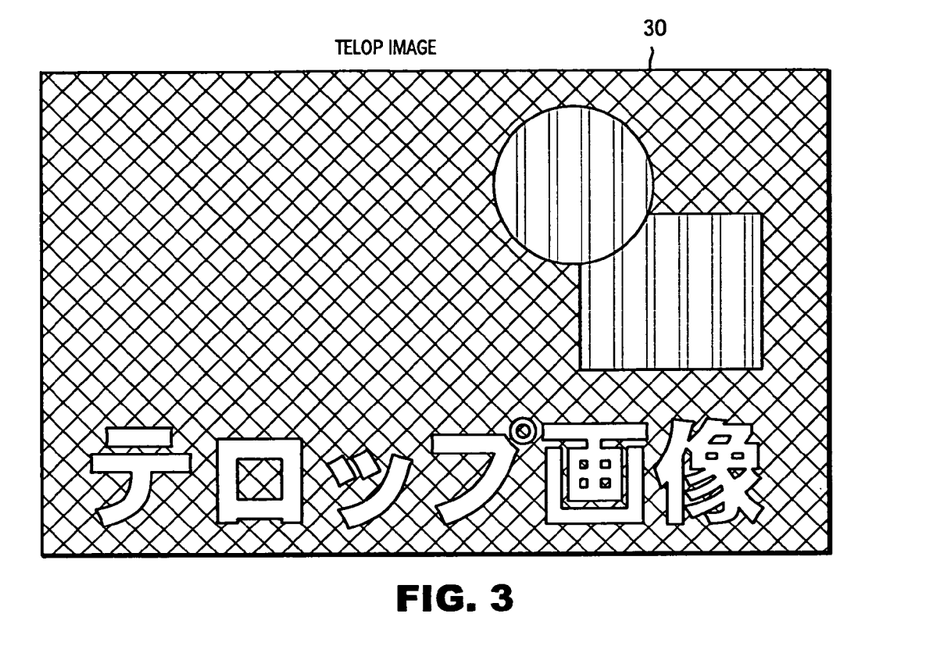
FIG. 3 shows an example of a telop image 30.

FIG. 3 shows an example of the telop image 30. The telop image 30 is an image to be displayed in a manner that it is superimposed on the background image 20. The telop image 30 has at least one telop portion as an object to be displayed. For example, in FIG. 3, the telop image 30 has white letters forming the words of "telop image", a red circle and a blue square.

Figure 4:
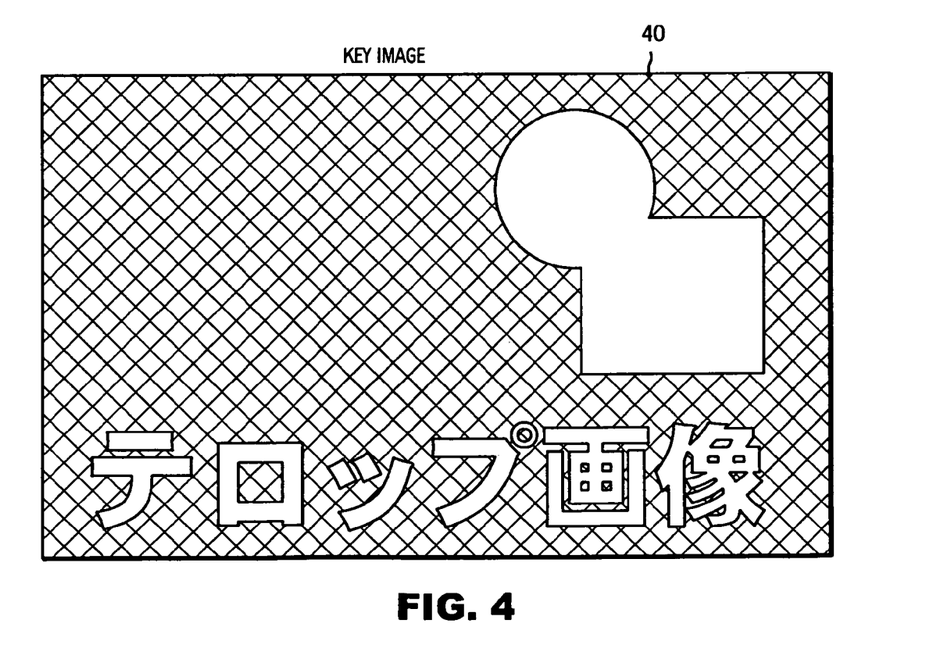
FIG. 4 shows an example of a key image 40.

FIG. 4 shows an example of the key image 40. The key image 40 indicates, for each pixel, a transmittance at which the background image 20 is displayed through the telop image 30. More specifically, in the key image 40, the transmittances are arranged as luminance or brightness values in the same arrangement as that of the pixels of the telop image 30 for which transmittances are to be specified.

For example, in FIG. 4, each of the brightness values of the white letters forming "telop image", circular area and square area has a maximum value indicating that the background image 20 cannot transmit through these areas. On the contrary, the brightness value of the area other than these areas has a minimum brightness value indicating that the background image 20 can completely transmit through the area. Thus, the transmittance of the background image 20 indicated by a lower brightness value is higher than that indicated by a higher brightness value.

Figure 5:
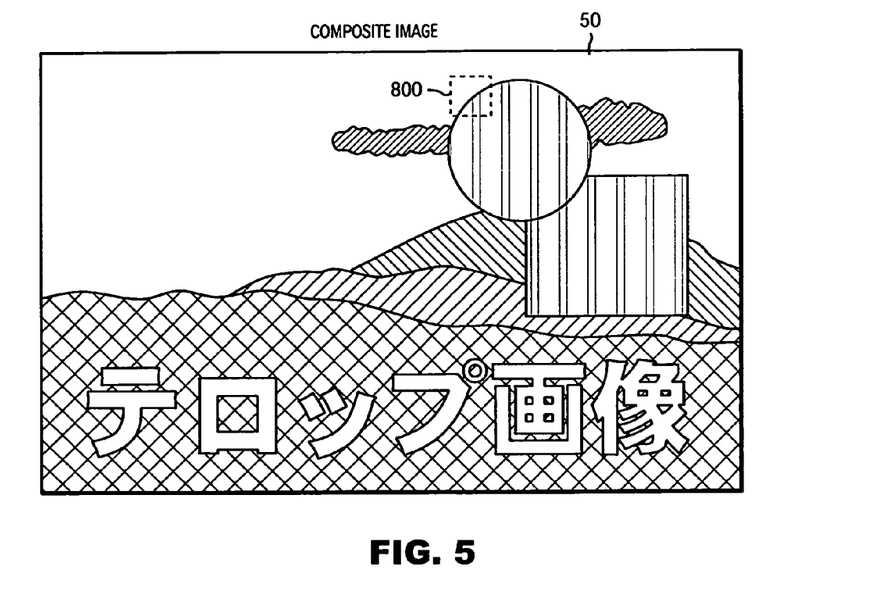
FIG. 5 shows an example of a composite image 50.

FIG. 5 shows an example of the composite image 50. The telop system superimposes the telop image 30 on the background image 20 and displays them as a composite image 50. Specifically, the areas of the white letters, circle and square are displayed as part of the composite image 50 as they are, without allowing the background image 20 to transmit through them. On the contrary, in the area excluding the white letters, circle and square, the background image 20 is displayed as it is without the telop image 30 being displayed. A partial image 800 included in the composite image 50 will be described later with reference to FIG. 8.

Figure 6:
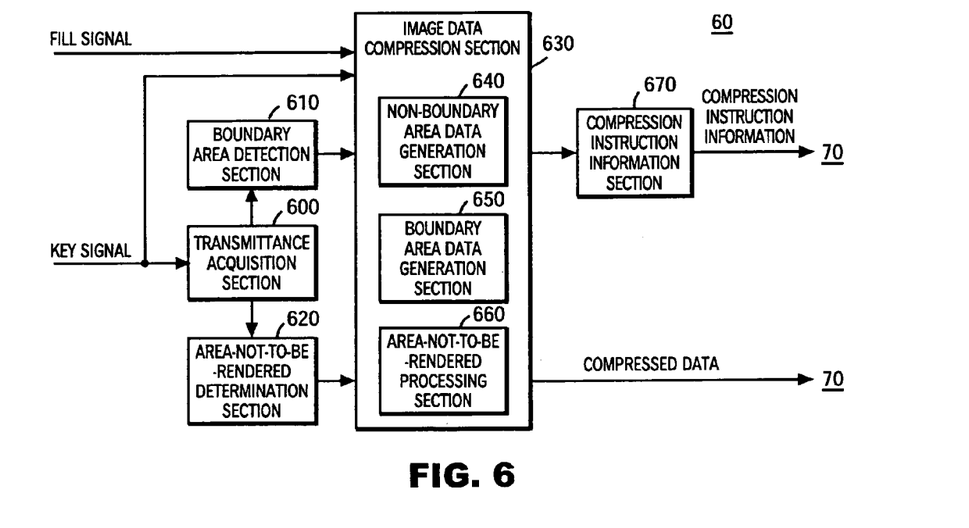
FIG. 6 shows a configuration of an image compression device 60.

FIG. 6 shows a configuration of the image compression device 60. The image compression device 60 comprises a transmittance acquisition section 600, a boundary area detection section 610, an area-not-to-be-rendered determination section 620, an image data compression section 630 and a compression instruction information generation section 670. The transmittance acquisition section 600 acquires a transmittance specified for each pixel, with which the background image 20 is to be displayed through the telop image 30. Specifically, the transmittance acquisition section 600 acquires a key image 40 in which transmittances of the respective pixels of a telop image 30, for which transmittances are to be specified, are arranged as brightness values in the same manner as the arrangement of the pixels of the telop image.

The boundary area detection section 610 detects boundary areas which include both of internal and external parts of an object rendered in the telop image 30, from among plural areas included in the telop image 30, based on the key image 40. For example, the boundary area detection section 610 detects an area included in the telop image 30 as a boundary area if the area includes both of pixels with transmittances greater than a predetermined first reference transmittance and pixels with transmittances equal to or smaller than the first reference transmittance.

The area-not-to-be-rendered determination section 620 determines, for each of the plural areas included in the telop image 30, that the area is an area which is not required to be rendered if the transmittances of all pixels included in the area are greater than a second reference transmittance which allows the background image 20 to transmit more as compared with the first reference transmittance. This area is referred to as an area not to be rendered.

The image data compression section 630 selects, for each of the areas included in the telop image 30, a compression mode for compressing the area based on the transmittance of each pixel included in the area, and compresses the area in the selected compression mode. Furthermore, the image data compression section 630 may compress the key image 40. The image data compression section 630 then sends compressed data formed by compressing the telop image 30 and the key image 40, to the image expansion device 70.

More specifically, the image data compression section 630 comprises a non-boundary area data generation section 640 for compressing non-boundary areas which are not boundary areas, a boundary area data generation section 650 for compressing boundary areas, and an area-not-to-be-rendered processing section 660 for compressing areas not to be rendered.

By compressing the non-boundary areas in a predetermined first compression mode, the non-boundary area data generation section 640 generates partial compressed data in the compressed data, corresponding to the non-boundary areas. The boundary area data generation section 650 generates partial compressed data in the compressed data, corresponding to the boundary areas, from the boundary areas, in a mode in which difference between images before compression and after expansion is less in comparison with a case where the boundary areas are compressed in the first compression mode.

The area-not-to-be-rendered processing section 660 removes image data indicating an area not to be rendered, from the compressed data. The area-not-to-be-rendered processing section 660 then attaches information indicating that rendering of the area is unnecessary, to the compressed data. The compression instruction information generation section 670 generates, for each area included in the telop image 30, compression instruction information indicating a compression mode for the area and whether or not the area is an area not to be rendered. Preferably, the compression instruction information generation section 670 generates the compression instruction information by compressing the data indicating, for each area included in the image, a compression mode for the area and whether or not the area is an area not to be rendered, in a lossless compression mode. The compression instruction information generation section 670 then sends the compression instruction information to the image expansion device 70.

Figure 7:
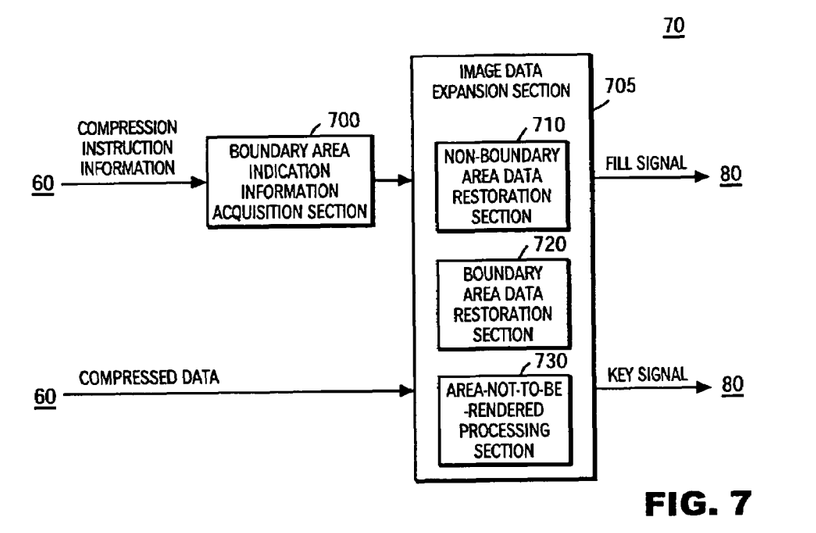
FIG. 7 shows a configuration of an image expansion device 70.

FIG. 7 shows a configuration of the image expansion device 70. The image expansion device 70 comprises a boundary area indication information acquisition section 700 and an image data expansion section 705. The boundary area indication information acquisition section 700 acquires the compression instruction information in association with the compressed data, from the image compression device 60. In this case, the compression instruction information is information indicating a compression mode for each of the areas included in the telop image 30. The compression mode differs depending on whether the area is a boundary area or a non-boundary area. That is, the compression instruction information is information indicating whether each of the areas included in the telop image 30 is a boundary area or a non-boundary area, that is, an example of the boundary area indication information according to the present invention. If the acquired compression instruction information is compressed in a lossless compression mode, then the boundary area indication information acquisition section 700 expands the compression instruction information in a mode corresponding to the lossless compression mode.

The image data expansion section 705 expands the compressed data based on the compression instruction information, and outputs the telop image 30 and the key image 40 which have been expanded, as a fill signal and a key signal to an external device, respectively. More specifically, the image data expansion section 705 comprises a non-boundary area data restoration section 710, a boundary area data restoration section 720 and an area-not-to-be-rendered processing section 730. The non-boundary area data restoration section 710 restores non-boundary areas by expanding partial compressed data in the compressed data, corresponding to the non-boundary areas, in a first expansion mode corresponding to the first compression mode.

The boundary area data restoration section 720 restores boundary areas from partial compressed data in the compressed data, corresponding to the boundary areas, in a mode in which difference between images before compression and after expansion is less in comparison with a case where the partial compressed data is expanded in the first expansion mode. The area-not-to-be-rendered processing section 730 expands partial compressed data in the compressed data, corresponding to areas not to be rendered, into a partial image consisting of pixels, for example, with a brightness component of 0.

The details of a partial image 800, a part of the composite image 50 shown in FIG. 5, will be now described.

Figure 8:
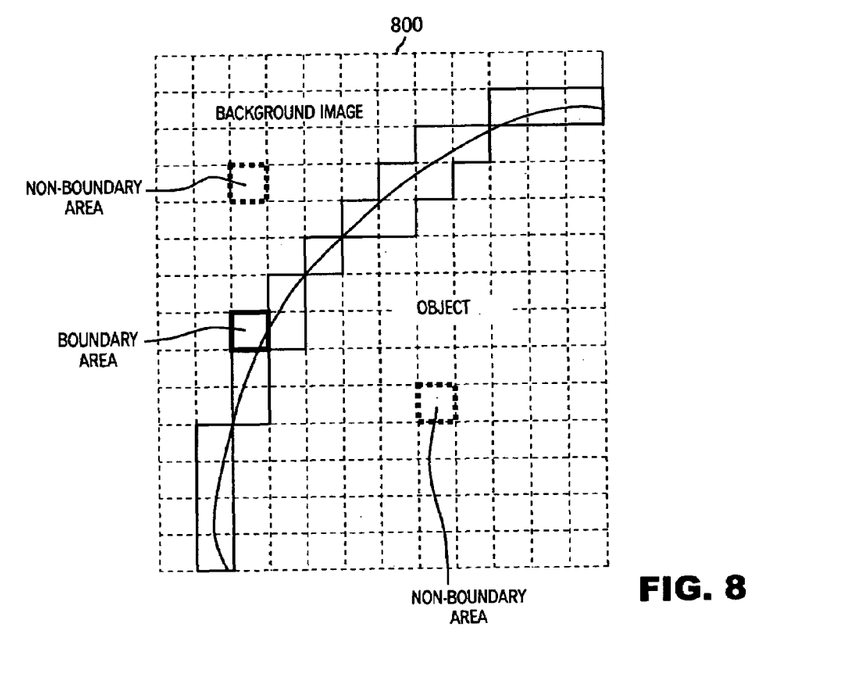
FIG. 8 is an enlarged view of a partial image 800.

FIG. 8 is an enlarged view of the partial image 800. The partial image 800 includes the background image 20 and an object rendered in a manner that it is superimposed on the background image 20. Also, the partial image 800 has plural areas arranged in a matrix. These areas are partitioned by broken and solid lines. Thus, the area according to the present invention is a partial image partitioned according to a system which is irrelevant to the boundary of the object. As an example, the area according to the present invention refers to each of plural areas which are formed by partitioning an image with eight (8) dots by eight (8) dots in horizontal and vertical directions.

The partial image 800 includes boundary areas which include both of internal and external parts of the object. The boundary areas are denoted by thick solid lines. Thus, a boundary area is an area which includes a boundary line between the object and the background image 20 as well as a part of the object and a part of the background image 20.

The partial image 800 also includes non-boundary areas each of which includes only one of the internal and external parts of the object. Some non-boundary areas are denoted by thick broken lines. Thus, a non-boundary area is an area which does not include the boundary line between the object and the background image 20. An area which includes a boundary line between an object and another object and does not include the background image 20 may be regarded as either a non-boundary area or a boundary area.

Figure 9:
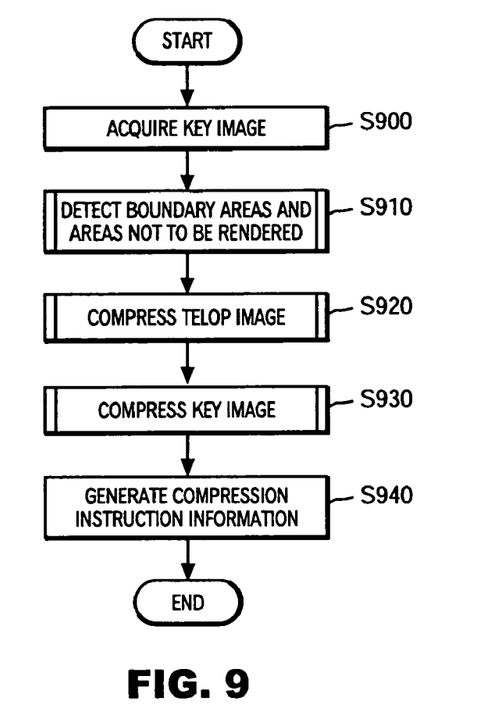
FIG. 9 shows an example of an image compression processing performed by the image compression device 60.

FIG. 9 shows an example of an image compression processing performed by the image compression device 60. The transmittance acquisition section 600 acquires a key image 40 (S900). The boundary area detection section 610 detects non-boundary areas, and the area-not-to-be-rendered determination section 620 detects areas not to be rendered (S910). The image data compression section 630 generates compressed data by compressing the telop image 30 (S920). The image data compression section 630 then generates compressed data by compressing the key image 40 (S930). The compression instruction information generation section 670 generates compression instruction information (S940).

Figure 10:
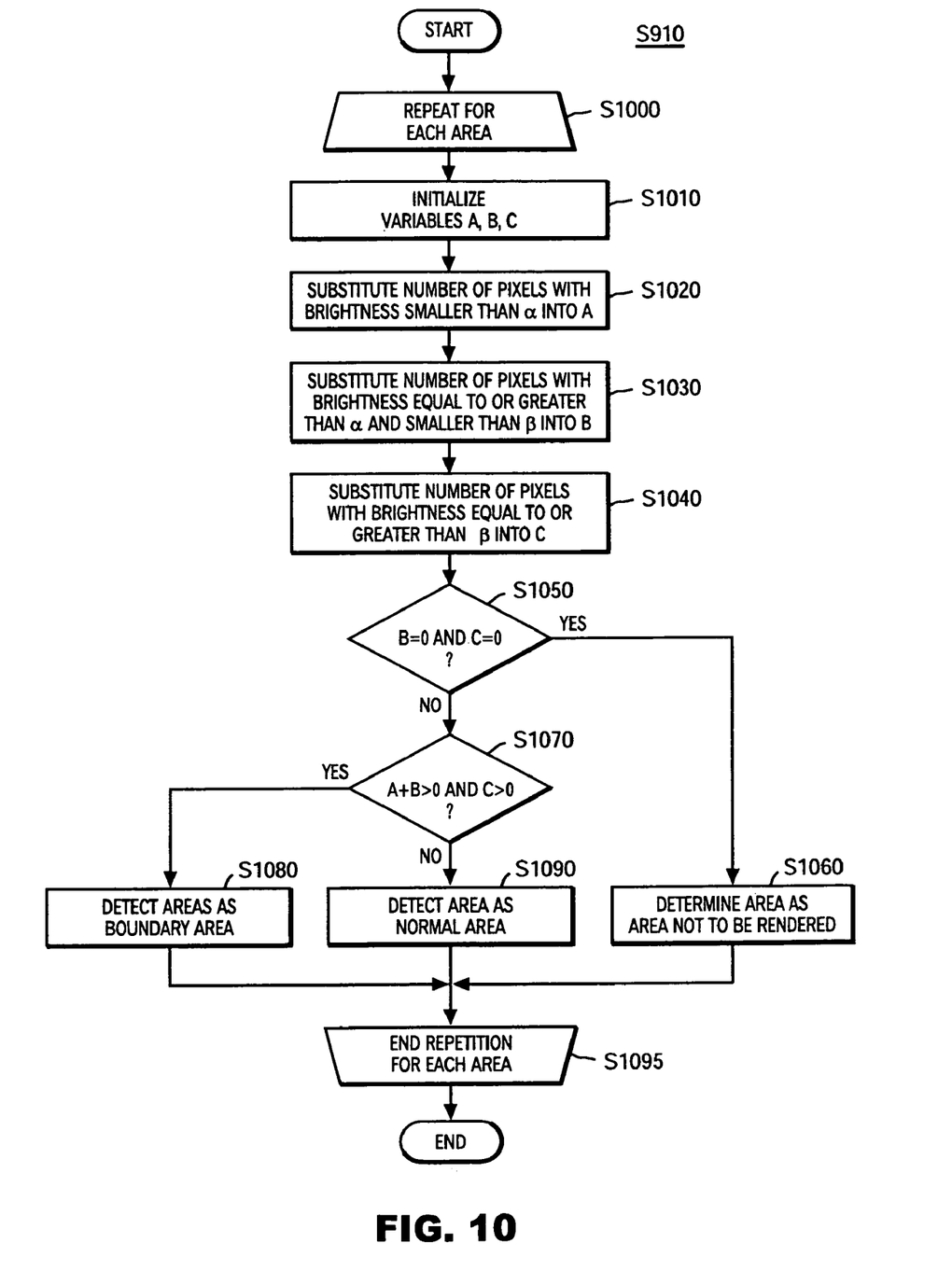
FIG. 10 shows details of processing performed at S910.

FIG. 10 shows the details of the processing performed at S910. The boundary area detection section 610 performs the following processing for each of plural areas included in the key image 40 (S1000). First, the boundary area detection section 610 initializes variables A, B and C for determining a boundary area and an area not to be rendered, to 0 (S1010). The boundary area detection section 610 then substitutes the number of pixels with brightness values smaller than a predetermined value $\alpha$ in the area, into the variable A (S1020). In this case, the brightness value $\alpha$ indicates the second reference transmittance according to the present invention. That is, the boundary area detection section 610 substitutes the number of pixels with transmittances greater than the second reference transmittance into the variable A. In this case, the brightness value $\alpha$ indicating the second reference transmittance may be 1/8, 1/16 or 1/32 of the maximum brightness.

The boundary area detection section 610 then substitutes the number of pixels with brightness values equal to or greater than $\alpha$ and smaller than $\beta$, which is specified as a value greater than $\alpha$, in the area, into the variable B (S1030). In this case, the brightness value $\beta$ indicates the first reference transmittance according to the present invention. That is, the boundary area detection section 610 substitutes the number of pixels with transmittances greater than the first reference transmittance and equal to or smaller than the second reference transmittance, into the variable B. As a result, the sum of the variables A and B is the number of pixels with transmittances greater than the first reference transmittance. In this case, the brightness value $\beta$ indicating the first reference transmittance may be 1/4 or 1/2 of the maximum brightness.

The boundary area detection section 610 then substitutes the number of pixels with brightness values equal to or greater than $\beta$, in this area, into the variable C (S1040). That is, the boundary area detection section 610 substitutes the number of pixels with transmittances equal to or smaller than the first reference transmittance, into the variable C. If B=0 and C=0 (S1050: YES), then the area-not-to-be-rendered determination section 620 determines an area in the telop image 30 corresponding to the area as an area not to be rendered (S1060). That is, if the transmittances of all the pixels in an area are equal to or greater than the second reference transmittance, the area-not-to-be-rendered determination section 620 determines that area as an area not to be rendered. The area-not-to-be-rendered determination section 620 may determine the corresponding area in the key image 40 as an area not to be rendered.

On the contrary, if it is not satisfied that B=0 and C=0 (S1050: NO), then the boundary area detection section 610 determines whether or not it is satisfied that A+B>0 and C>0 (S1070). If it is satisfied that A+B>0 and C>0 (S1070: YES), then the boundary area detection section 610 detects an area in the telop image 30 corresponding to the area as a boundary area (S1080). That is, if an area includes both of pixels with transmittances greater than the first reference transmittance and pixels with transmittances equal to or smaller than the first reference transmittance, then the boundary area detection section 610 detects the area as a boundary area. The boundary area detection section 610 may detect the corresponding area in the key image 40 as a boundary area.

On the contrary, if it is not satisfied that A+B>0 and C>0 (S1070: NO), then the boundary area detection section 610 detects an area in the telop image 30 corresponding to the area as a normal area (S1090). The normal area is an example of the non-boundary area according to the present invention, and refers to an area which is a non-boundary area and is not an area not to be rendered. The boundary area detection section 610 may detect the corresponding area in the key image 40 as a normal area.

The boundary area detection section 610 performs the above processing for each of the plural areas included in the key image 40 (S1095).

As described above and shown in the figure, the image compression device 60 determines a boundary part of an object in the telop image 30 based on the key image 40. Thus, it is possible to enhance the accuracy of determination in comparison with a case where the boundary part is determined only based on the telop image 30 since the transmittance is additionally used as a parameter.

Alternatively, the boundary area detection section 610 may perform the above processing for each of the plural areas included in the telop image 30 without using the key image 40. In this case, the boundary area detection section 610 detects an area as a boundary area if the area includes both of pixels with brightness equal to or greater than predetermined reference brightness and pixels with brightness smaller than the reference brightness. Thus, boundary areas can be detected with a certain level of accuracy even when the key image 40 cannot be acquired.

Figure 11:
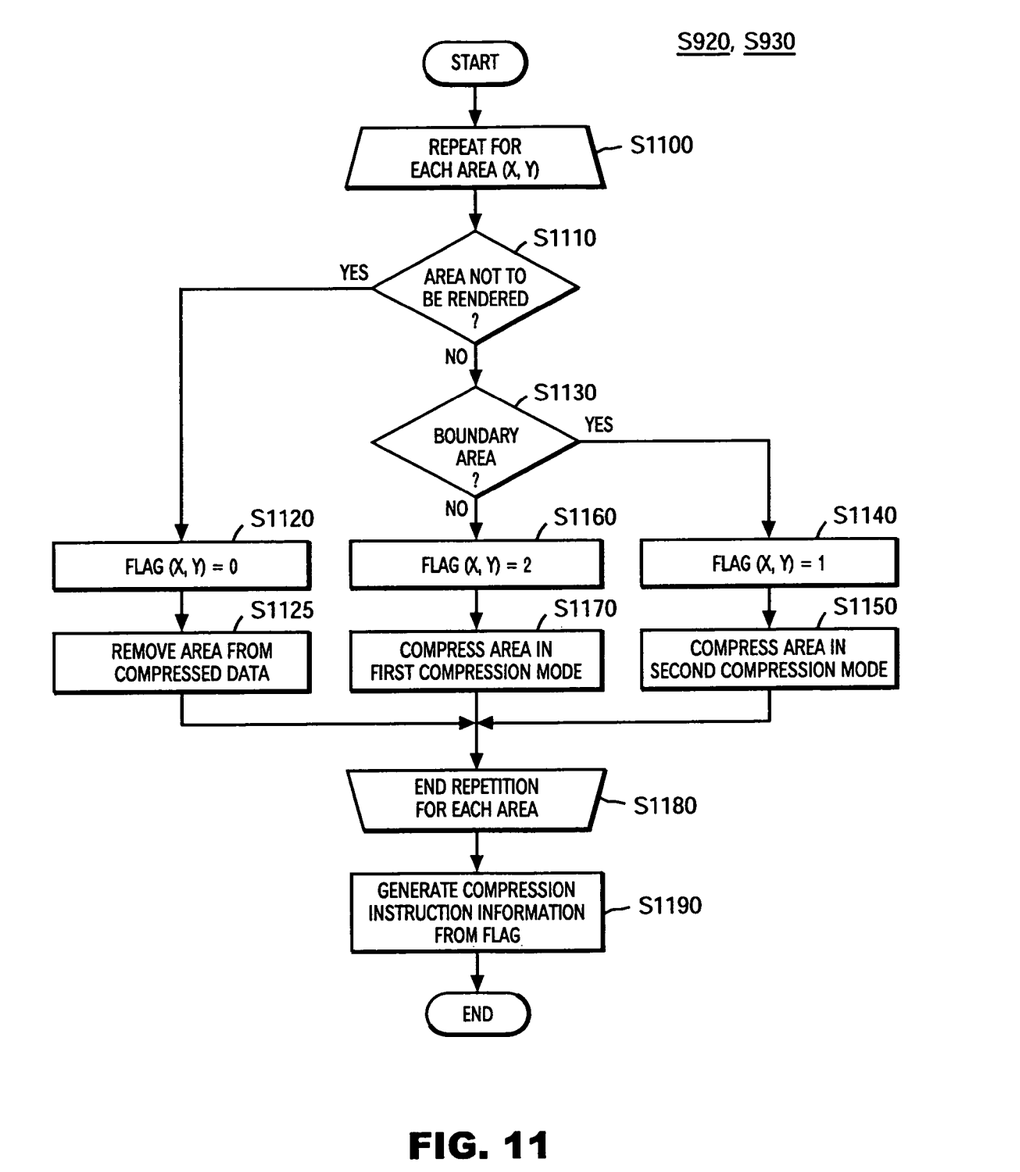
FIG. 11 shows details of processing performed at S920 and S930.

FIG. 11 shows the details of the processing performed at S920 and S930. First, description will be made on S920. The image data compression section 630 performs the following processing for each of the plural areas included in the telop image 30 (S1100). A variable X indicates an order in which the area to be processed is arranged in the x-axis direction in the telop image 30. A variable Y indicates an order in which the area to be processed is arranged in the y-axis direction in the telop image 30. That is, the image data compression section 630 performs the following processing for each of possible pairs of values which the variable X and the variable Y can take.

First, if the area is an area not to be rendered (S1110: YES), then the area-not-to-be-rendered processing section 660 substitutes 0 indicating that rendering of the area is unnecessary, into a flag (X, Y) (S1120). In this case, the flag (X, Y) is an array variable provided for each pair of the variables X and Y. The area-not-to-be-rendered processing section 660 removes the area from the compressed data (S1125).

On the contrary, if the area is not an area not to be rendered (S1110: NO), then the area-not-to-be-rendered processing section 660 determines whether or not the area is a boundary area (S1130). If the area is not a boundary area (S1130: NO), then the non-boundary area data generation section 640 substitutes a value of 2 indicating that the non-boundary area should be compressed in the first compression mode, into the flag (X, Y) (S1160). The non-boundary area data generation section 640 then compresses the non-boundary areas in the first compression mode (S1170).

On the contrary, if the area is a boundary area (S1130: YES), then the boundary area data generation section 650 substitutes a value of 1 indicating that the boundary area should be compressed in the second compression mode, into the flag (X, Y) (S1140). The boundary area data generation section 650 then compresses the boundary area in the second compression mode in which difference between images before compression and after expansion is less in comparison with a case where the boundary area is compressed in the first mode (S1150).

In this case, the difference between images is, for example, a value based on an S/N (signal-to-noise) ratio, which indicates the magnitude of the amount of signal relative to the amount of noise. Alternatively, the difference between images may be a value obtained by calculating difference values between the respective pixel values before compression and after expansion and summing up the absolute values of the calculated difference values.

The first compression mode is a lossy compression mode in which an image obtained by expansion is different from an image before compression. As an example, the first compression mode is JPEG compression in which discrete cosine transform, quantization and Huffman compression are combined. In this case, the second compression mode is, for example, a lossless compression mode in which the same image before compression can be obtained after expansion. As an example, the second compression mode is GIF compression such as Huffman compression.

The size of partial compressed data after compression may be smaller in the case of compressing an image in the first compression mode in comparison with the case of compressing the same image in the second compression mode. That is, the non-boundary area data generation section 640 may compress non-boundary areas in the first compression mode to reduce the size of partial compressed data after compression in comparison with compressing the non-boundary areas in the second compression mode. Thereby, the size of the compressed data can be reduced more when the non-boundary areas occupy a larger portion of the image.

Furthermore, the first compression mode may be based on frequency components of difference between pixel values of consecutively arranged pixels, and the second compression mode may be another mode which is not based on the frequency components. Thereby, the image quality of boundary areas where the pixel values change sharply can be enhanced while maintaining the compression rate of the entire image.

Alternatively, the boundary area data generation section 650 may generate data indicating boundary areas as partial compressed data without compressing the boundary areas. Thereby, the time required for compression and expansion can be shortened while maintaining the image quality after expansion.

The image data compression section 630 performs the above processing for each of the plural areas included in the telop image 30 (S1180). Finally, the compression instruction information generation section 670 generates compression instruction information from the flag (X, Y) (S1190). For example, the compression instruction information generation section 670 may generate the compression instruction information by compressing the flags (X, Y), which are arrayed variables, in a lossless compression mode. The image compression device 60 may store the compressed data and the compression instruction information generated as described above in a recording device such as a memory or a hard disk drive, or send them to the image expansion device 70 via a network.

Then, the image data compression section 630 performs almost the same processing for the key image 40 (S930) as that performed for the telop image 30. More specifically, the non-boundary area data generation section 640 compresses areas in the key image 40 corresponding to the non-boundary areas in the telop image 30, in the same compression mode used for the non-boundary areas in the telop image 30. Similarly, the boundary area data generation section 650 compresses areas in the key image 40 corresponding to the boundary areas in the telop image 30, in the same compression mode used for the boundary areas in the telop image 30. The area-not-to-be-rendered processing section 660 removes areas in the key image 40 corresponding to the areas not to be rendered in the telop image 30, from the compressed data. Other processing performed for the key image 40 is almost the same as the above processing performed for the telop image 30, and therefore description thereof will be omitted here.

Figure 12:
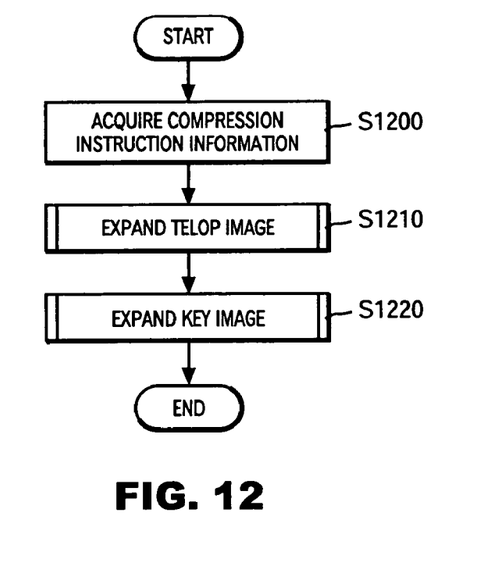
FIG. 12 shows an example of an image expansion processing performed by the image expansion device 70.

FIG. 12 shows an example of image expansion processing to be performed by the image expansion device 70. The boundary area indication information acquisition section 700 acquires the compression instruction information in association with the compressed data (S1200). If the acquired compression instruction information is compressed in a lossless compression mode, then the boundary area indication information acquisition section 700 expands the compression instruction information in a mode corresponding to the loss less compression mode. Then, the image data expansion section 705 expands the compressed data indicating the telop image 30 based on the compression instruction information to restore the telop image 30 (S1210). The image data expansion section 705 then expands the compressed data indicating the key image 40 based on the compression instruction information to restore the key image 40 (S1220).

Figure 13:
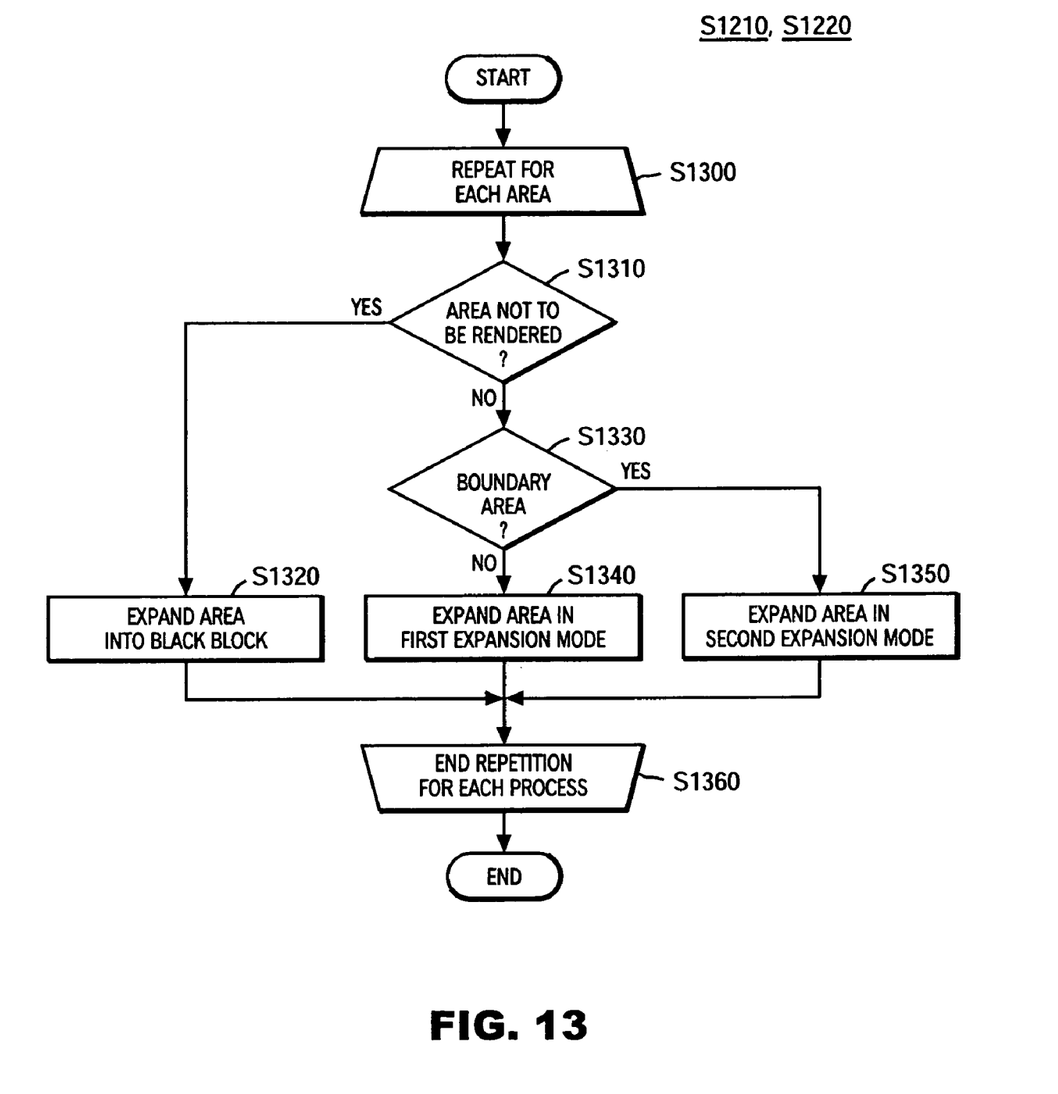
FIG. 13 shows details of processing performed at S1210 and S1220.

FIG. 13 shows the details of the processing performed at S1210 and S1220. First, description will be made on S1210. The image expansion device 70 repeatedly performs the following processing for each of plural areas to be expanded as the telop images 30 (S1300). The non-boundary area data restoration section 710 determines whether or not the area is an area not to be rendered (S1310). Specifically, the non-boundary area data restoration section 710 determines that the area is an area not to be rendered if the value of the flag (X, Y) corresponding to the area in the compression instruction information is 0.

If the area is an area not to be rendered (S1310: YES), then the area-not-to-be-rendered processing section 730 generates a black block as that area (S1320). Specifically, the area-not-to-be-rendered processing section 730 may generate a partial image as that area in which pixels with brightness of 0 and chrominance or color difference of 0 are arranged. On the contrary, if the area is not an area not to be rendered (S1310: NO), then the non-boundary area data restoration section 710 determines whether or not the area is a boundary area (S1330). If the area is not a boundary area (S1330: NO), then the non-boundary area data restoration section 710 restores a non-boundary area by expanding partial compressed data corresponding to the area in a first expansion mode corresponding to the first compression mode to restore the non-boundary area (S1340).

On the contrary, if the area is a boundary area (S1330: YES), then the boundary area data restoration section 720 restores a boundary area by expanding the partial compressed data corresponding to the area in a second expansion mode corresponding to the second compression mode to restore the boundary area (S1350). The image expansion device 70 repeatedly performs the above processing for each of plural areas to be expanded as the telop image 30 (S1360).

Then, the image expansion device 70 performs almost the same processing for the key image 40 (S1220) as that performed for the telop image 30. More specifically, the non-boundary area data restoration section 710 restores areas in the key image 40 corresponding to the non-boundary areas in the telop image 30 in the same expansion mode as that used for the non-boundary areas in the telop image 30. Similarly, the boundary area data restoration section 720 expands areas in the key image 40 corresponding to the boundary areas in the telop image 30 in the same expansion mode as that used for the boundary areas in the telop image 30. Other processing performed for the key image 40 is almost the same as the above processing performed for the telop image 30, and therefore description thereof will be omitted here.

Figure 14:
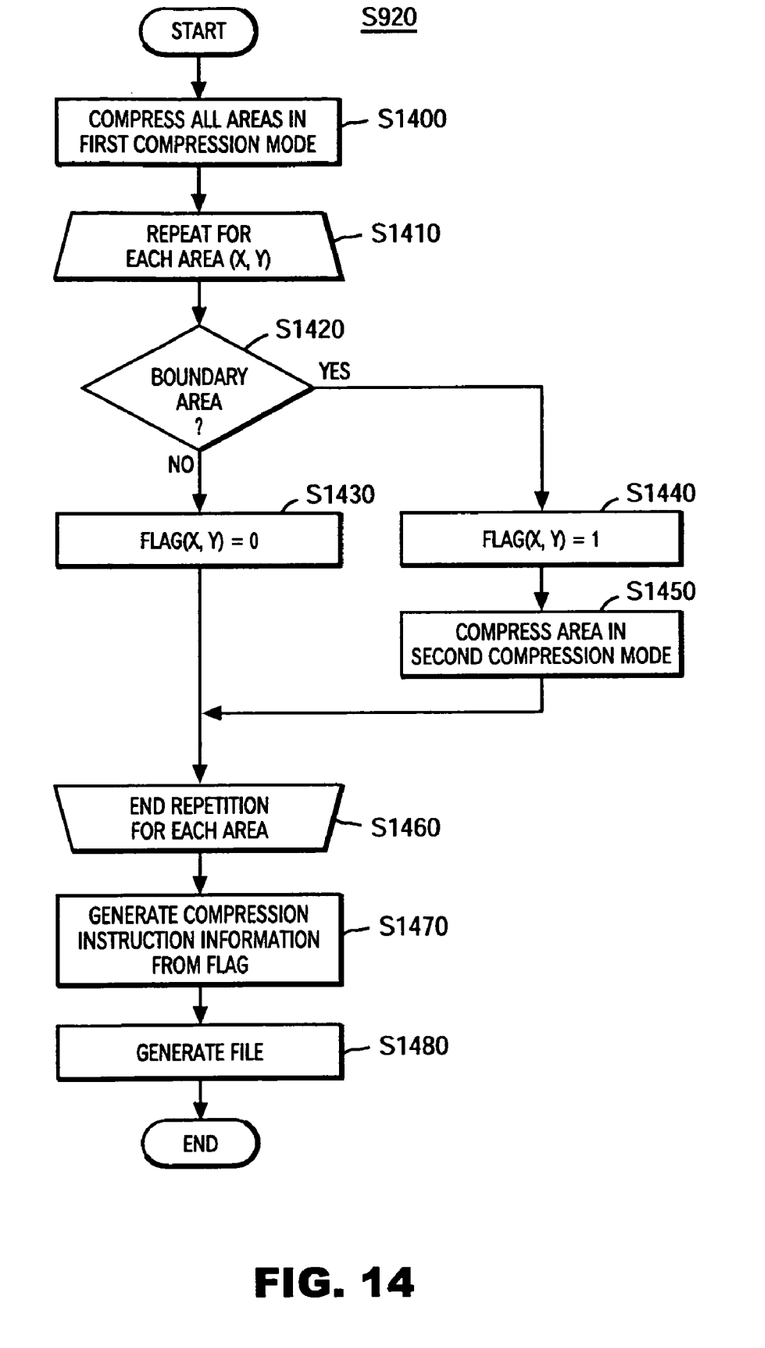
FIG. 14 shows a variation of the processing performed at S920.

FIG. 14 shows a variation of the processing performed at S920. The non-boundary area data generation section 640 generates first partial compressed data by compressing all areas included in the telop image 30 in the first compression mode (S1400). Then, the image compression device 60 repeatedly performs the following processing for each of the plural areas (S1410). If the area to be processed is not a boundary area (S1420: NO), then the non-boundary area data generation section 640 substitutes a value of 0 indicating that the area should be compressed in the first compression mode, into the flag (X, Y) (S1430).

On the contrary, if the area to be processed is a boundary area (S1420: YES), then the boundary area data generation section 650 substitutes a value of 1 indicating that the area should be compressed in the second compression mode, into the flag (X, Y) (S1440). The boundary area data generation section 650 generates second partial compressed data by compressing the area in the second compression mode (S1450). The image compression device 60 repeatedly performs the above processing for each of the plural areas (S1460).

The compression instruction information generation section 670 generates compression instruction information from the flag (S1470). For example, the compression instruction information generation section 670 generates compression instruction information by compressing the flags, which are arrayed variables, in a lossless compression mode. Alternatively, the compression instruction information generation section 670 may generate coordinates information as the compression instruction information, indicating an order in which the areas compressed in the second compression mode are arranged in the telop image 30. Thereby, the size of the compression instruction information can be reduced when there are few areas compressed in the second compression mode.

The boundary area data generation section 650 generates a file in which each of the second partial compressed data is attached to each of the first partial compressed data (S1480). Furthermore, the boundary area data generation section 650 records data attachment information to a header portion of the file where attribute information of the image is stored, to indicate that the second partial compressed data is attached.

As described above, according to the variation shown in FIG. 14, it is possible to enhance affinity with the existing system for compressing the entire image in the first compression mode. Thereby, it is possible not only to easily design and implement the image compression device 60 but also to facilitate improvement and modification of the existing system. The processing performed at S930 may also be varied like the variation for the processing performed at S920 shown in FIG. 14.

Figure 15:
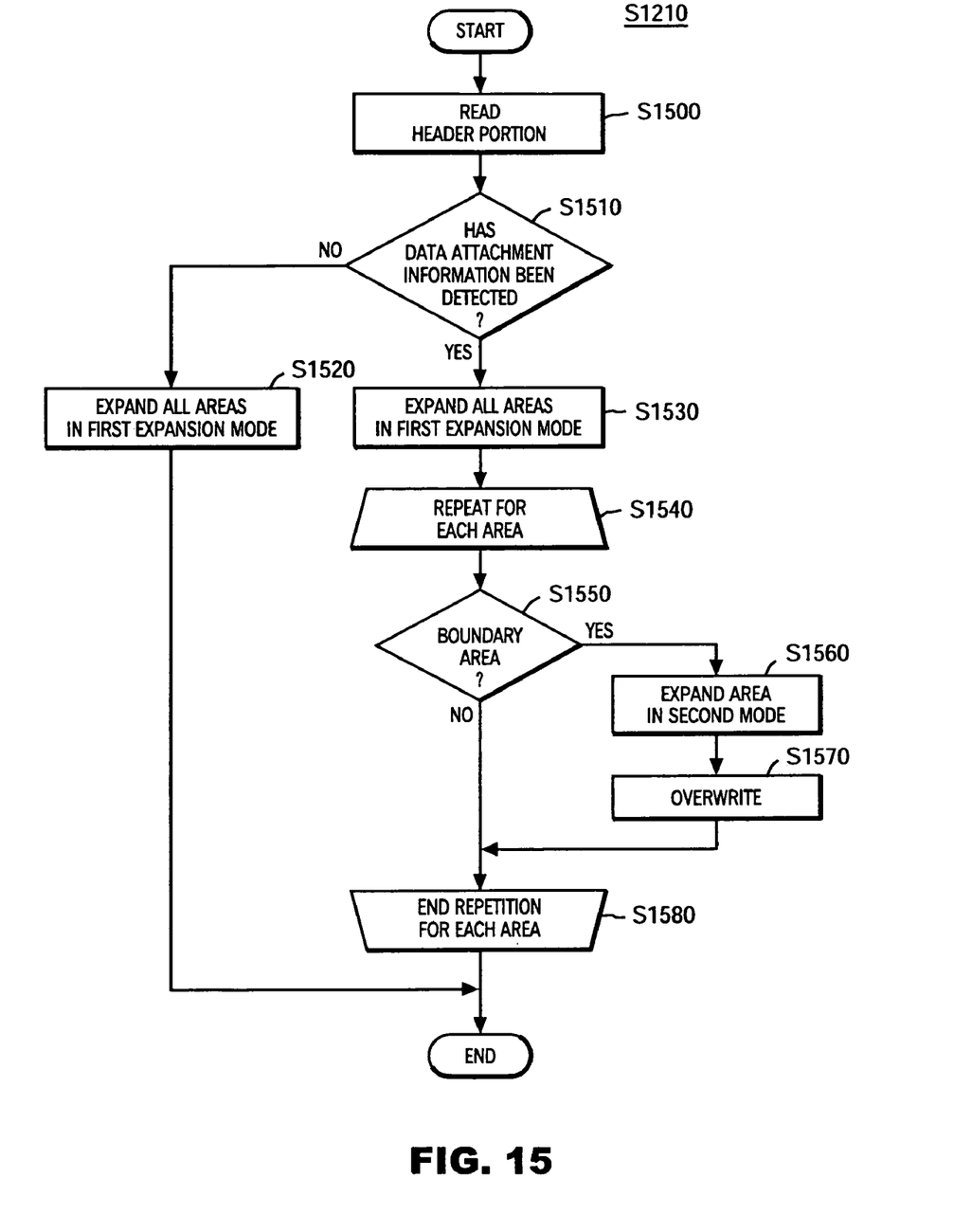
FIG. 15 shows a variation of the processing performed at S1210.

FIG. 15 shows a variation of the processing performed at S1210. The processing in FIG. 15 corresponds to the processing shown in FIG. 14. The non-boundary area data restoration section 710 reads the header portion of the file which has been received from the image compression device 60 and in which the compressed image data is stored (S1500). If the non-boundary area data restoration section 710 cannot detect the data attachment information from the header portion, then it expands all the areas in the first expansion mode (S1520).

On the contrary, if the data attachment information is detected from the header portion (S1510: YES), then the non-boundary area data restoration section 710 expands all the areas in the first expansion mode. In this way, the non-boundary area data restoration section 710 expands the first partial compressed data in the first expansion mode, irrespective of whether or not the data attachment information has been detected in the header portion of the image file.

Then, the boundary area data restoration section 720 repeatedly performs the following processing for each of the plural areas in the telop image 30 which are to be expanded (S1540). First, the boundary area data restoration section 720 determines whether or not the area is a boundary area (S1550). If the area is a boundary areas (S1550: YES), then the boundary area data restoration section 720 expands the second partial compressed data corresponding to the area in the second expansion mode (S1560).

The boundary area data restoration section 720 then overwrites the image expanded from the first partial compressed data at S1530 with the image expanded from the second partial compressed data (S1570). The boundary area data restoration section 720 repeatedly performs the above processing for each of the plural areas in the telop image 30 which are to be expanded (S1580). The processing performed at S1220 may also be varied like the variation for the processing performed at S1210 shown in FIG. 15.

As described above, the image expansion device 70 according to this variation can properly expand not only a file in which the second partial compressed data is attached but also a normal file compressed in the first compression mode. Thereby, it is possible to enhance affinity with the existing compression device.

Figure 16:
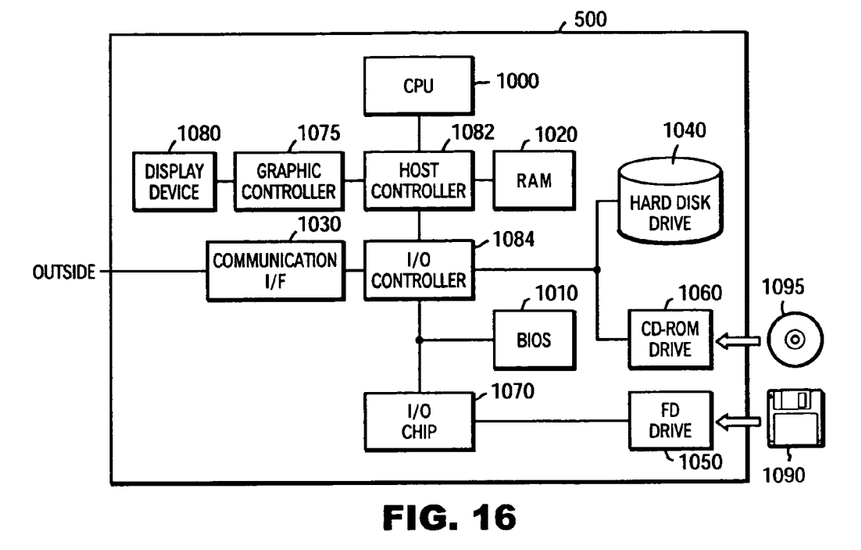
FIG. 16 shows an exemplary hardware configuration of a computer 500 functioning as the image compression device 60.

FIG. 16 shows an exemplary hardware configuration of a computer 500 functioning as the image compression device 60. The computer 500 is provided with a CPU-related part having a CPU 1000, a RAM 1020 and a graphic controller 1075 which are mutually connected by a host controller 1082; an input/output part having a communication interface 1030, a hard disk drive 1040 and a CD-ROM drive 1060 which are connected to the host controller 1082 via an input/output controller 1084; and a legacy input/output part having a BIOS 1010, a flexible disk drive 1050 and an input/output chip 1070 which are connected to the input/output controller 1084.

The host controller 1082 connects the RAM 1020 with the CPU 1000 and the graphic controller 1075 which access the RAM 1020 at a high transfer rate. The CPU 1000 operates based on the BIOS 1010 and programs stored in the RAM 1020 to control each part. The graphic controller 1075 acquires image data generated by the CPU 1000 or other device on a frame buffer provided in the RAM 1020, and displays it on a display device 1080. Alternatively, the graphic controller 1075 may include a frame buffer for storing image data generated by the CPU 1000 or other device.

The input/output controller 1084 connects the host controller 1082 with the communication interface 1030, the hard disk drive 1040 and the CD-ROM drive 1060 which are relatively fast input/output devices. The communication interface 1030 communicates with external devices via a network. The hard disk drive 1040 stores programs and data to be used by the computer 500. The CD-ROM drive 1060 reads a program or data from a CD-ROM 1095 and provides it to the RAM 1020 or the hard disk drive 1040.

The BIOS 1010 and relatively slow input/output devices, such as the flexible disk drive 1050 and the input/output chip 1070, are connected to the input/output controller 1084. The BIOS 1010 stores a boot program, which is executed by the CPU 1000 when the computer 500 is activated, and programs dependent on the hardware of the computer 500. The flexible disk drive 1050 reads a program or data from a flexible disk 1090 and provides it to the RAM 1020 or the hard disk drive 1040. The input/output chip 1070 connects the flexible disk 1090, and various input/output devices via, for example, a parallel port, a serial port, a keyboard port, a mouse port, etc.

Programs to be provided to the computer 500 are stored in a recording medium such as the flexible disk 1090, the CD-ROM 1095 and an IC card, and provided by a user. The programs are read from the recording medium via the input/output chip 1070 and/or the input/output controller 1084, installed on the computer 500 and executed. The read programs may be provided to the image expansion device 70 via a network and executed on the image expansion device 70. The programs executed on the image compression device 60 and the image expansion device 70 cause the computer 500 to operate in the same manner as that of the image compression device 60 and the image expansion device 70 described above with reference to FIGS. 1 to 15.

The programs described above may be stored in an external recording medium. As the recording medium, an optical recording medium such as a DVD or a PD, a magneto-optic recording medium such as an MD, a tape medium, or a semiconductor memory such as an IC card may be used in addition to the flexible disk 1090 or the CD-ROM 1095. It is also possible to use as a recording medium a storage device such as a hard disk or an RAM provided in a server system connected to a private communication network or the Internet to provide a program to the computer 500 via the network.

Figure 17:
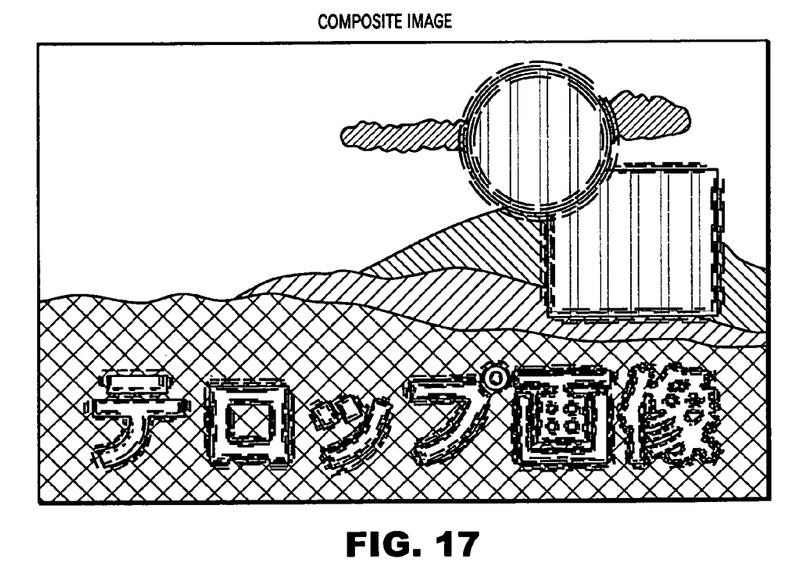
FIG. 17 shows another example of a composite image.

FIG. 17 shows another example of a composite image. In this example, the image data compression section 630 compresses each area in a telop image in a lossy compression mode, irrespective of whether or not the area is a boundary area. Therefore, image disturbance occurs at object boundaries. This image disturbance results from errors in the discrete cosine transform or removal of frequency components due to the quantization. Thus, in a portion where pixel values change sharply, such as a boundary portion of an object, difference between images before lossy compression and after expansion is often larger.

However, the image compression device 60 according to the embodiment can enhance the image quality after expansion by compressing boundary areas in a lossless compression mode while maintaining the compression rate for non-boundary areas.

While the present invention has been described with reference to the embodiments, the technical scope of the present invention is not limited to the scope of the embodiments described above. It is apparent to those skilled in the art that various modifications or improvements can be made to the embodiments described above. It is apparent from the appended claims that such modified or improved embodiments can also be included in the technical scope of the present invention.

The invention claimed is:

1. An image compression device for generating compressed data formed by compressing an image, said image compression device comprising:
   a boundary area detection section for detecting boundary areas which include both of internal and external parts of an object rendered in the image, from among plural areas included in the image;
   a non-boundary area data generation section for, by compressing non-boundary areas which are not the boundary areas in the image, in a predetermined compression mode, generating partially compressed data in the compressed data, corresponding to the non-boundary areas; and
   a boundary area data generation section for generating partially compressed data in the compressed data, corresponding to the boundary areas, from the boundary areas, in a mode in which difference between images before compression and after expansion is less in comparison with a case where the boundary areas are compressed in the predetermined compression mode, wherein the image is a telop image to be displayed in a manner that the telop image is superimposed on a background image, and the object is a telop portion of the telop image,
   wherein the image compression device further comprises a transmittance acquisition section for acquiring a transmittance at which the background image is displayed through the telop image, the transmittance being specified for each pixel, and
   wherein said boundary area detection section detects each of plural areas included in the telop image as the boundary area if the area includes both of pixels with a transmittance greater than a predetermined first reference transmittance and pixels with a transmittance equal to or smaller than the first reference transmittance.

2. The image compression device according to claim 1, wherein the transmittance acquisition section acquires a key image in which transmittances of the respective pixels of a telop image, for which transmittances are to be specified, are arranged as brightness values in the same manner as that the pixels of the telop image are arranged, and
   wherein said boundary area data generation section further compresses areas in the key image, corresponding to the boundary areas in the telop image, in the same compression mode in which the boundary areas in the telop image are compressed.

3. The image compression device according to claim 1, further comprising:
   an area-not-to-be-rendered determination section which determines, for each of the plural areas included in the telop image, that the area is an area which is not required to be rendered if the transmittances of all pixels included in the area are greater than a second reference transmittance at which the background image transmits more than at the first reference transmittance; and
   an area-not-to-be rendered processing section for compressing the image by removing image data indicating the area determined as an area which is not required to be rendered, from the compressed data, and adding information indicating that the rendering of the area is not required to the compressed data.

* * * * *